US009916909B2

(12) United States Patent
Mistreanu et al.

(10) Patent No.: US 9,916,909 B2
(45) Date of Patent: Mar. 13, 2018

(54) SWIRLER, STEAM SEPARATOR INCLUDING THE SWIRLER, AND NUCLEAR BOILING WATER REACTOR INCLUDING THE SAME

(71) Applicants: Adrian M. Mistreanu, Wilmington, NC (US); James Scott Bowman, Wilmington, NC (US); Phillip Glen Ellison, Wilmington, NC (US); John S. Bennion, Wilmington, NC (US); Bulent Alpay, Wilmington, NC (US)

(72) Inventors: Adrian M. Mistreanu, Wilmington, NC (US); James Scott Bowman, Wilmington, NC (US); Phillip Glen Ellison, Wilmington, NC (US); John S. Bennion, Wilmington, NC (US); Bulent Alpay, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 237 days.

(21) Appl. No.: 14/587,226

(22) Filed: Dec. 31, 2014

(65) Prior Publication Data

US 2016/0189810 A1    Jun. 30, 2016

(51) Int. Cl.
*G21C 15/16* (2006.01)
*F22B 37/26* (2006.01)
(Continued)

(52) U.S. Cl.
CPC ............... *G21C 15/16* (2013.01); *F01K 5/00* (2013.01); *F22B 37/268* (2013.01); *B01D 45/16* (2013.01); *Y02E 30/31* (2013.01)

(58) Field of Classification Search
CPC .. E21B 21/063; Y10T 29/53113; Y02E 30/31; Y10S 55/23; Y10S 122/14;
(Continued)

(56) References Cited

U.S. PATENT DOCUMENTS 3,169,842 A    2/1965  Streete et al.
3,448,563 A *  6/1969  Sobeck ..................... B04C 3/04
                                                      210/512.2
(Continued)

FOREIGN PATENT DOCUMENTS

JP          4008288 B2    11/2007
JP       2014121707 A      7/2014

OTHER PUBLICATIONS

Office Action for corresponding Finnish Application No. 20155941 dated May 2, 2017 and English translation thereof.

*Primary Examiner* — Sharon M Davis
(74) *Attorney, Agent, or Firm* — Harness, Dickey & Pierce (57) ABSTRACT

In one embodiment, the steam separator includes a standpipe configured to receive a gas-liquid two-phase flow stream, and a first swirler configured to receive the gas-liquid two-phase flow stream from the standpipe. The first swirler is configured to separate the gas-liquid two-phase flow stream. The first swirler includes a direct flow portion and an indirect flow portion. The direct flow portion has a direct flow channel for permitting direct flow of the gas-liquid two-phase flow stream through the first swirler, and the indirect flow portion has at least one indirect flow channel defined by at least one vane in the first swirler for providing an indirect flow of the gas-liquid two-phase flow stream through the first swirler.

8 Claims, 9 Drawing Sheets

(51) Int. Cl.
  *F01K 5/00*         (2006.01)
  *B01D 45/16*        (2006.01)
(58) Field of Classification Search
  CPC .......... G21C 15/16; G21C 1/08; G21C 1/084;
        G21C 1/322; G21C 2003/3432; G21Y
        2004/302; F22B 37/483; F22B 37/268;
        F22B 37/10; F22B 37/50; F22B 1/00;
        F22B 37/30; F22B 37/306; F22B 37/32;
        F22B 37/327; B01D 19/0042; B01D
        19/0057; B01D 45/16; B01D 5/0021;
        F16T 1/34
  See application file for complete search history.

(56) References Cited

U.S. PATENT DOCUMENTS

| | | | | |
|---|---|---|---|---|
| 3,461,652 A * | 8/1969 | Sato | ........................ | B01D 45/12 |
| | | | | 55/448 |
| 5,100,609 A * | 3/1992 | Oosterkamp | ............ | G21C 7/32 |
| | | | | 376/209 |
| 8,231,336 B2 * | 7/2012 | Maier | ................... | F04D 29/701 |
| | | | | 415/121.2 |
| 2006/0260869 A1 * | 11/2006 | Kim | ......................... | F01N 1/12 |
| | | | | 181/279 |
| 2007/0201604 A1 * | 8/2007 | Chaki | .................... | B01D 45/16 |
| | | | | 376/301 |
| 2010/0055308 A1 | 3/2010 | Dulka et al. | | |
| 2012/0117928 A1 * | 5/2012 | Kondo | .................. | B01D 45/14 |
| | | | | 55/442 |

\* cited by examiner

SWIRLER, STEAM SEPARATOR INCLUDING THE SWIRLER, AND NUCLEAR BOILING WATER REACTOR INCLUDING THE SAME

BACKGROUND

Field

Example embodiments relate to a swirler, a steam separation system for a nuclear boiling water reactor and/or a nuclear boiling water reactor.

Description of Related Art

A boiling water nuclear reactor generates steam by utilizing heat generated from a core and rotates a turbine and a power generator by means of the steam. In a pressurized water nuclear reactor, cooling water separately flows into a primary cooling system circulating through the nuclear reactor, and a secondary cooling system serving as a steam generator. In the primary cooling system, high-temperature water is generated by the heat generated from the nuclear reactor core. In the secondary cooling system, water in the secondary cooling system is boiled in a heat exchanger in the steam generator to become steam, which rotates a turbine or a power generator.

Regardless of the reactor type, moisture must be removed from the steam to be supplied to the turbine. To this end, a typical reactor is provided with a plurality of steam separators, dryers and the like so as to remove water from a two-phase flow of steam and water generated in the nuclear reactor or the steam generator.

In a conventional steam separator, even if the water separated from the two-phase flow that has flowed in the steam separator is discharged outside the barrel through the water discharge pipe, most of the steam flows out from the upper part of the barrel. Therefore, if the two-phase flow stream (FS) velocity is high and/or steam separator inlet moisture content is high, the number of the minute droplets that are carried by the steam is increased, which may result in an increase in moisture carry-over. The increase in moisture carry-over increases the radioactivity levels in the plant and adversely affects outage performance. If the moisture carry-over levels become undesirably high, certain components of the main steam line and turbine can be adversely impacted as a result of enhanced degradation from such mechanisms such as flow accelerated corrosion leading to higher maintenance costs.

SUMMARY

At least one embodiment relates to a steam separator.

In one embodiment, the steam separator includes a standpipe configured to receive a gas-liquid two-phase flow stream, and a first swirler configured to receive the gas-liquid two-phase flow stream from the standpipe. The first swirler is configured to separate the gas-liquid two-phase flow stream. The first swirler includes a direct flow portion and an indirect flow portion. The direct flow portion has a direct flow channel for permitting direct flow of the gas-liquid two-phase flow stream through the first swirler, and the indirect flow portion has at least one indirect flow channel defined by at least one vane in the first swirler for providing an indirect flow of the gas-liquid two-phase flow stream through the first swirler.

In one embodiment, the swirler includes an outer housing defining a first internal space, and a plurality of vanes. The plurality of vanes include the at least one vane, the plurality of vanes extend from an interior surface of the outer housing towards an interior of the outer housing, and the plurality of vanes divide the first internal space into at least one direct flow channel and at least one indirect flow channel.

In one embodiment, lateral surfaces of adjacent ones of the plurality of vanes each define one of the indirect flow channels.

In one embodiment, a gap in the internal space between the distal ends of the plurality of vanes serves as the direct flow channel.

In one embodiment, the swirler includes an inner housing defining the direct flow channel, and the plurality of vanes extend from the interior surface of the outer housing to an exterior of the inner housing.

In one embodiment, the inner housing has a symmetrical cross-section.

In one embodiment, the inner housing has an asymmetrical cross-section.

In one embodiment, the steam separator include a second swirler disposed downstream of the gas-liquid two-phase flow stream from the first swirler.

At least one embodiment relates to a nuclear boiling water reactor.

In one embodiment, the reactor includes a reactor pressure vessel, a core in the reactor pressure vessel, and a plurality of steam separator. The plurality of steam separators are arranged above the core in the reactor pressure vessel. Some of the plurality of steam separator includes a standpipe configured to receive a gas-liquid two-phase flow stream and a first diffuser configured to receive the gas-liquid two-phase flow stream from the standpipe. The first diffuser includes a first swirler configured to separate the gas-liquid two-phase flow stream. The first swirler includes a direct flow portion and an indirect flow portion. The direct flow portion has a direct flow channel for permitting direct flow of the gas-liquid two-phase flow stream through the first swirler, and the indirect flow portion has at least one indirect flow channel defined by vanes in the first swirler for providing an indirect flow of the gas-liquid two-phase flow stream through the first swirler.

In one embodiment, a volume of the direct flow channel of at least one of the plurality of steam separators located above a central region of the core is greater than a volume of the direct flow channel of at least one of the plurality of steam separators located above a peripheral region of the core.

In one embodiment, the swirler includes an outer housing defining a first internal space and a plurality of vanes. The plurality of vanes include the at least one vane, the plurality of vanes extend from an interior surface of the outer housing towards an interior of the outer housing, and the plurality of vanes divide the first internal space into at least one direct flow channel and at least one indirect flow channel.

In one embodiment, lateral surfaces of adjacent ones of the plurality of vanes each define one of the indirect flow channels.

In one embodiment, a gap in the internal space between the distal ends of the plurality of vanes serves as the direct flow channel.

In one embodiment, the swirler includes an inner housing defining the direct flow channel, and the plurality of vanes extend from the interior surface of the outer housing to an exterior of the inner housing.

At least one embodiment is directed to a swirler.

In one embodiment, the swirler includes an outer housing defining a first internal space and a plurality of vanes extending from an interior surface of the outer housing towards an interior of the outer housing. The plurality of vanes divide the first internal space into at least one direct flow channel and at least one indirect flow channel.

In one embodiment, lateral surfaces of adjacent ones of the plurality of vanes each define one of the indirect flow channels.

In one embodiment, a gap in the internal space between the distal ends of the plurality of vanes serves as the direct flow channel.

In one embodiment, the swirler includes an inner housing defining the direct flow channel, and the plurality of vanes extend from the interior surface of the outer housing to an exterior of the inner housing.

BRIEF DESCRIPTION OF THE DRAWINGS

The various features and advantages of non-limiting example embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element is referred to as being "on," "connected to," "coupled to," or "covering" another element, it may be directly on, connected to, coupled to, or covering the other element or intervening elements that may be present. In contrast, when an element is referred to as being "directly on," "directly connected to," or "directly coupled to" another element, there are no intervening elements present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1:
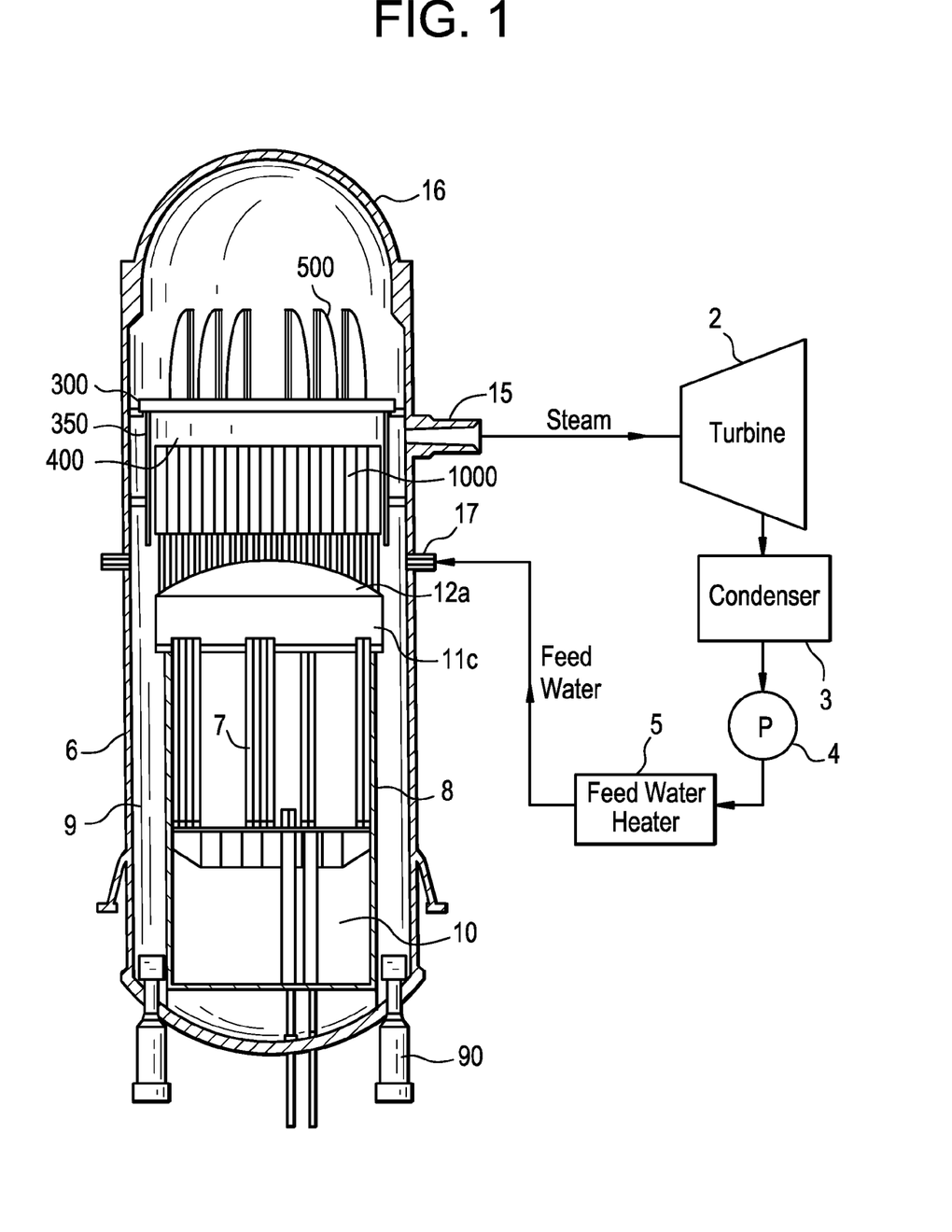
FIG. 1 is a cross-sectional view of a nuclear boiling water reactor according to an example embodiment.

FIG. 1 illustrates the structure of the nuclear BWR according to an example embodiment. In the nuclear BWR, a plurality of steam separators 1000 and a steam dryer system 500 having the structure described below are disposed in a dome 16 at the upper portion of the reactor pressure vessel 6. The following is a description of the structure inside the pressure vessel 6.

A cylindrical core shroud 8, which is concentric with the pressure vessel 6, is installed at a lower portion in the pressure vessel 6. A core lower plenum 10 is formed under the shroud 8 in the pressure vessel 6. A core 7 is disposed above this lower plenum 10 and surrounded by the shroud 8. There is also a core upper plenum 11c above the core 7. A shroud head 12a provided to the shroud 8 is disposed above the upper plenum 11c. It is to be noted that an annular space 9 is formed between the pressure vessel 6 and the shroud 8, and this functions as a circulation path for the light water coolant.

A prescribed number of holes (not shown) through which coolant passes are provided in the shroud head 12a. The plurality of steam separators 1000 are inserted into these holes and are aligned in parallel. The flow paths that join the core 7 and the steam separator 1000 are connected via the upper plenum 11c.

Also, a steam dryer system 500 is provided above the plurality of steam separators 1000. A support structure 300 (e.g., a support ring as shown), supports the steam dryer system 500 above the steam separators 1000 creating a dryer plenum 400 there between. A cylindrical dryer skirt 350, connected to the support ring, extends downward from the support ring 300. A feed water inlet nozzle 17 and a steam outlet nozzle 15 are provided at the side wall of the pressure vessel 6. Recirculation pumps 90 are provided at the lower portion of the reactor pressure vessel 6.

In the nuclear BWR, the wet steam generated in the core 7 by heating light water flows in each of the steam separators 1000 mounted on the shroud head 12a via the upper plenum 11c as a two-phase flow including the light water. In the steam separators 1000, the introduced gas-liquid two-phase FS passes through from the downward direction to the upward direction. Steam containing moisture that could not be removed is supplied to the steam dryer system 500 positioned above the steam separator 1000.

The steam (saturated steam) from which moisture is further removed by the steam dryer system 500 is exhausted from the steam outlet nozzle 15 and supplied to a turbine 2. This steam drives the turbine 2, which rotates a generator (not shown) joined to the turbine 2, and thereby power is generated. The steam exhausted from the turbine 2 is condensed at the condenser 3 and becomes condensed water. The condensed water, that is, the cooling water (light water) is supplied to a feed water heater 5 by a feed water pump 4. The cooling water heated by the feed water heater 5 is re-introduced to the pressure vessel 6 from the feed water nozzle 17.

Meanwhile, the water separated by the steam separator 1000 is mixed with the cooling water supplied from the feed water inlet nozzle 17 and descends the annular space 9 and is introduced to the core 7 via the lower plenum 10. At this time, the cooling water supplied to the core 7 is pressurized by a pump 90, which can be either internal or external to the nuclear BWR.

Figure 2:
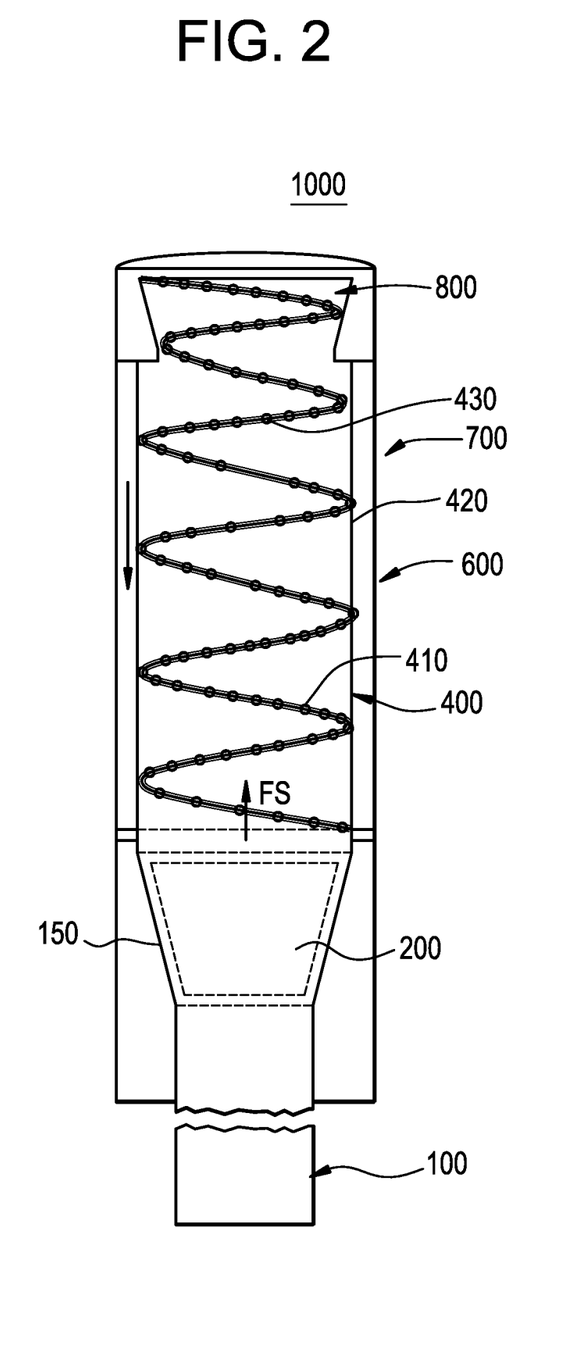
FIG. 2 is a longitudinal cross-sectional view of one of the steam separators 1000 according to an example embodiment.

FIG. 2 is a longitudinal cross-sectional view of one of the steam separators 1000 according to an example embodiment. It will be appreciated that each of, or some of, the plurality of steam separators 1000 may have the structure shown in FIG. 2.

In an example embodiment, the steam separator 1000 includes a standpipe 100, a first diffuser 150 including a swirler 200, a separation barrel 400, a skirt 600, a drain channel 700 and an optional second diffuser 800.

The standpipe 100 is configured to introduce a gas-liquid two-phase flow stream (FS), which is indicated by the arrow in FIG. 2. The gas of the gas-liquid two-phase FS may be steam, and the liquid of the gas-liquid two-phase FS may be water.

The inlet 110 of the standpipe 100 may have a cylindrical shape as shown or may have a bell mouth shape. The bell mouth shape of the inlet 110 mitigates or prevents a drop in pressure of the gas-liquid two-phase FS. The bellmouth shape of the inlet 110 has a variable curvature radii, which may be tuned to boundary conditions of the gas-liquid two-phase FS (e.g., flow, pressure and steam quality). The bellmouth shape of the inlet 110 may be modified based on characteristics of the gas-liquid two-phase FS entering the standpipe 100. The standpipe 100 has a cylindrical shape.

The standpipe 100 may be coated with a material that contributes to the mitigation or prevention of a drop in pressure of the gas-liquid two-phase FS. The coating material may be $TiO_2$, which is described in U.S. Patent Publication No. 2010/0055308, the entire contents of which are incorporated herein by reference.

The first diffuser 150 connects to the upper end surface of the standpipe 100 and forms a flow path. For example, the first diffuser 150 is welded to the standpipe 100. The interior of the first diffuser 150 is equipped with a swirler 200. Stated another way, the swirler 200 is the diffuser 150.

Figure 3A:
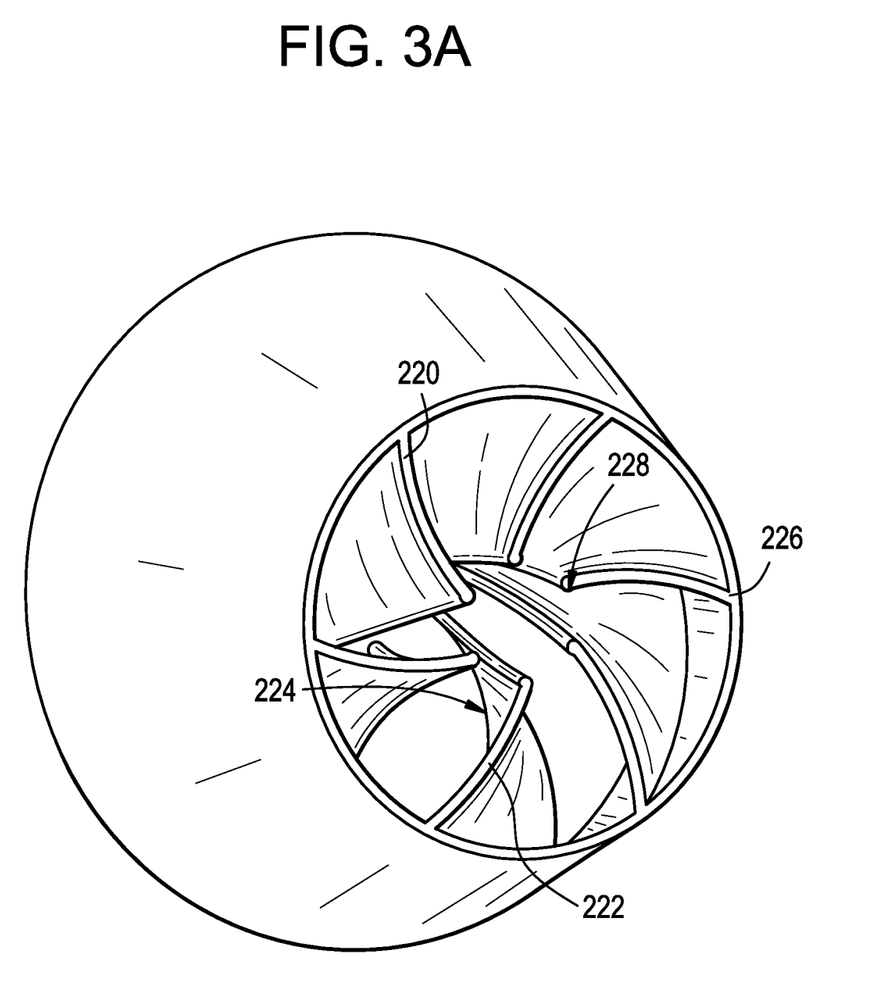
FIG. 3A is a perspective view of an example embodiment of a swirler of the steam separator of FIG. 2.
Figure 3B:
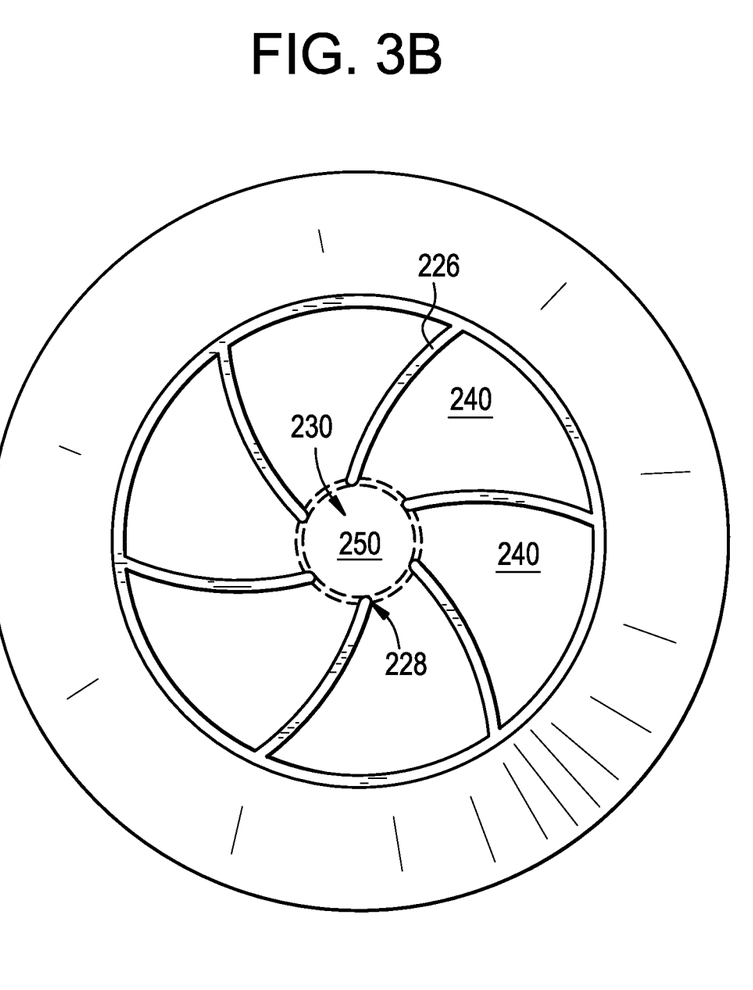
FIG. 3B is an end view of an example embodiment of the swirler in FIG. 3A.

FIG. 3A is a perspective view of an example embodiment of a swirler of the steam separator of FIG. 2, and FIG. 3B is an end view of an example embodiment of the swirler in FIG. 3A.

As shown, a plurality of vanes 220 extend from an interior surface of the swirler 200 towards a longitudinal axis of the swirler 200. The vanes 220 are curved. In one embodiment a profile of a leading edge 222 of the vanes 200 at an input end of the swirler 200 is the same as a profile of the trailing edge 224 at an output end of the swirler 200. In another embodiment, the profiles differ. Also, a thickness of the vanes 220 may be constant, or may vary. For example, the vanes 220 may be thicker at a root or proximal end 226 than towards the tip or distal end 228. In the embodiment of FIG. 3A, the tips 228 of the vanes do not meet, leaving a gap space 230. Furthermore, the profiles of the leading edge and/or trailing edge in other embodiments may not be curved at a fixed radii, but may vary over the extent of the profile. In other embodiments, the profiles of the leading edge and/or trailing edge may not be curved throughout the extent of the profile. Furthermore, in other embodiments, the profiles of the leading edge and/or trailing edge may have any linear/curvilinear profile. The gap space may be substantially circular in shape, but other shapes may be formed (e.g., elliptical, skewed elliptical, etc.).

The plurality of vanes 220 divide the interior space of the swirler 200 into a plurality of indirect flow channels 240 and a direct flow channel 250. Specifically, each indirect flow channel 240 is defined by an adjacent pair of vanes 220 and may follow a tortuous path. The direct flow channel 250 is along the gap space 230.

Figure 4A:
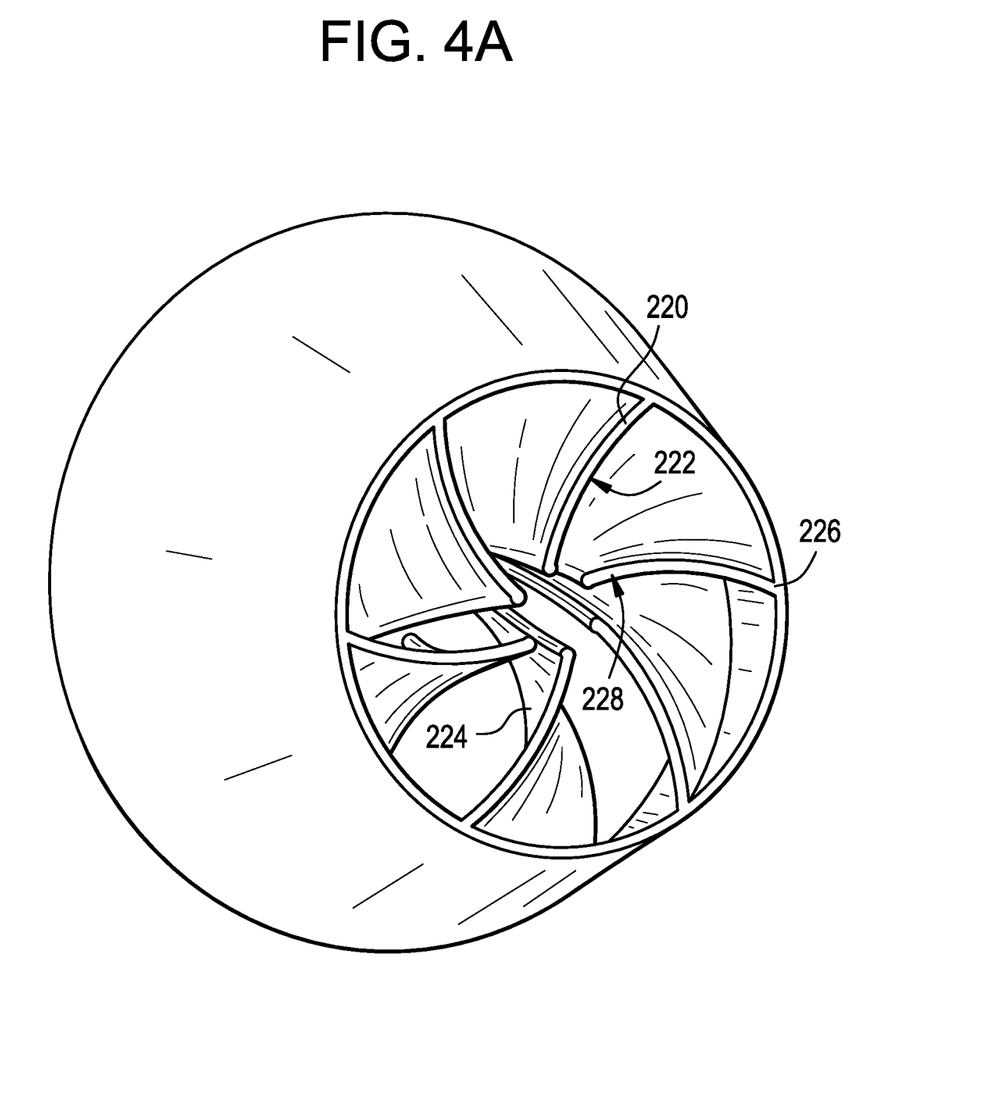
FIG. 4A is a perspective view of another example embodiment of a swirler of the steam separator of FIG. 2.
Figure 4B:
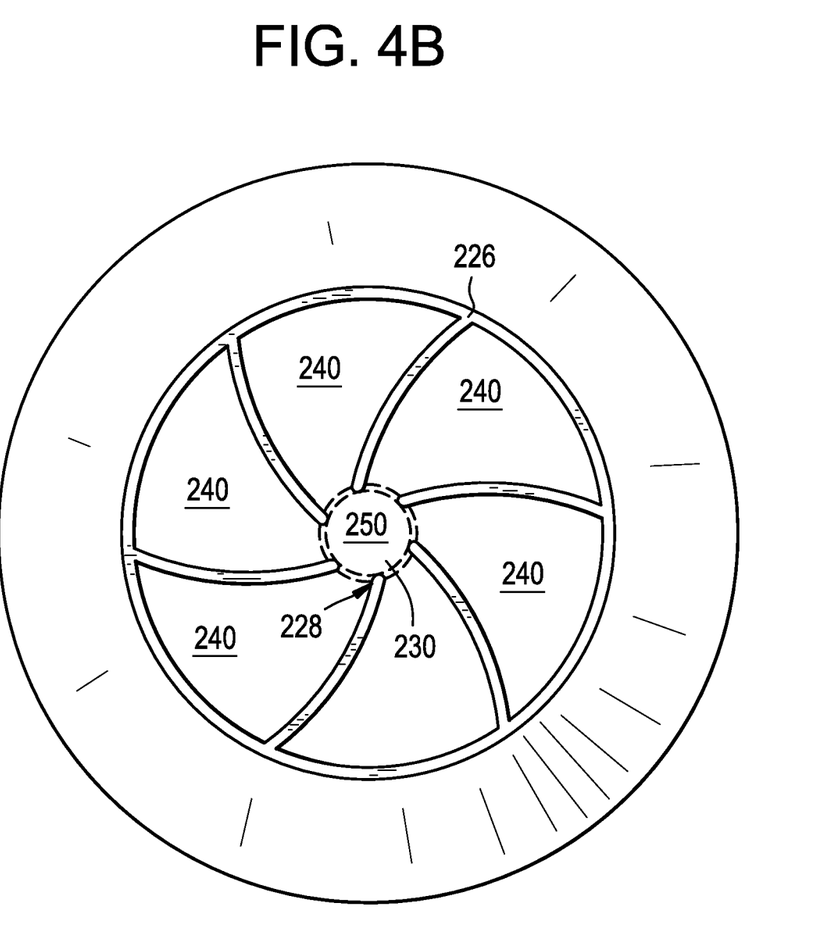
FIG. 4B is an end view of an example embodiment of the swirler in FIG. 4A.

FIG. 4A is a perspective view of an example embodiment of a swirler of the steam separator of FIG. 2, and FIG. 4B is an end view of an example embodiment of the swirler in FIG. 4A. The embodiment of FIGS. 4A-4B is the same as the embodiment of FIGS. 3A-3B except that the gap space 230 is considerably smaller, and therefore the direct flow channel 250 has a smaller cross-section than in the embodiment of FIGS. 3A-3B.

Figure 5A:
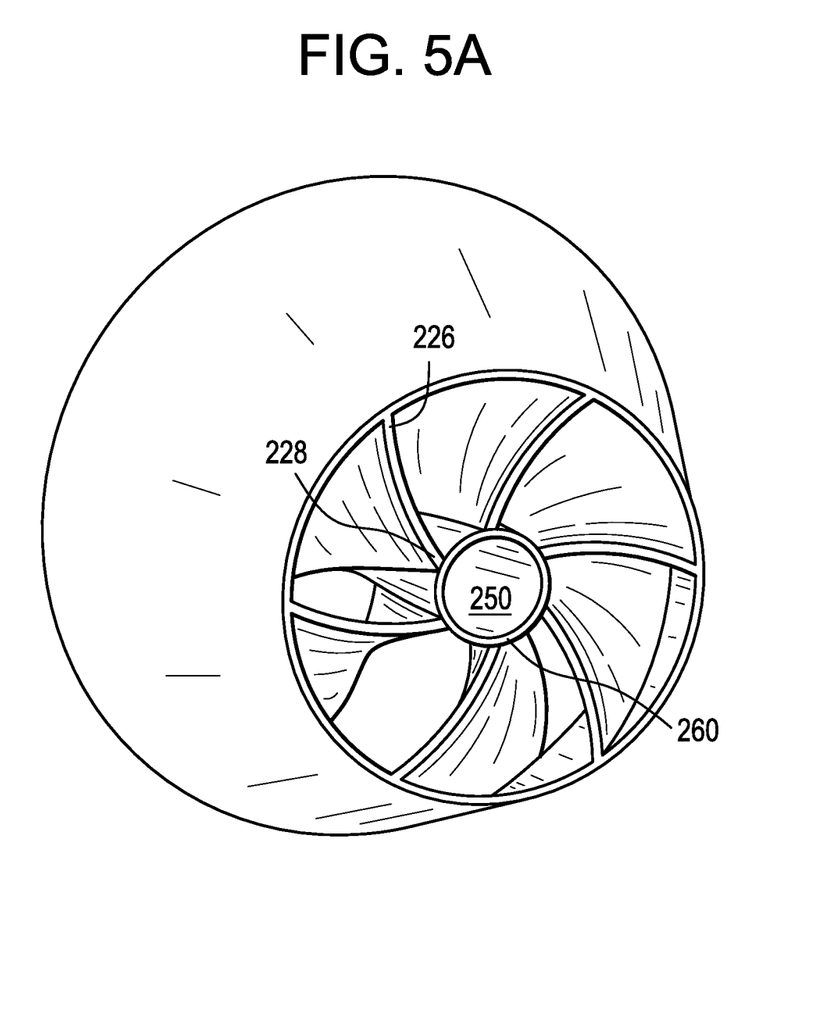
FIG. 5A is a perspective view of a further example embodiment of a swirler of the steam separator of FIG. 2.
Figure 5B:
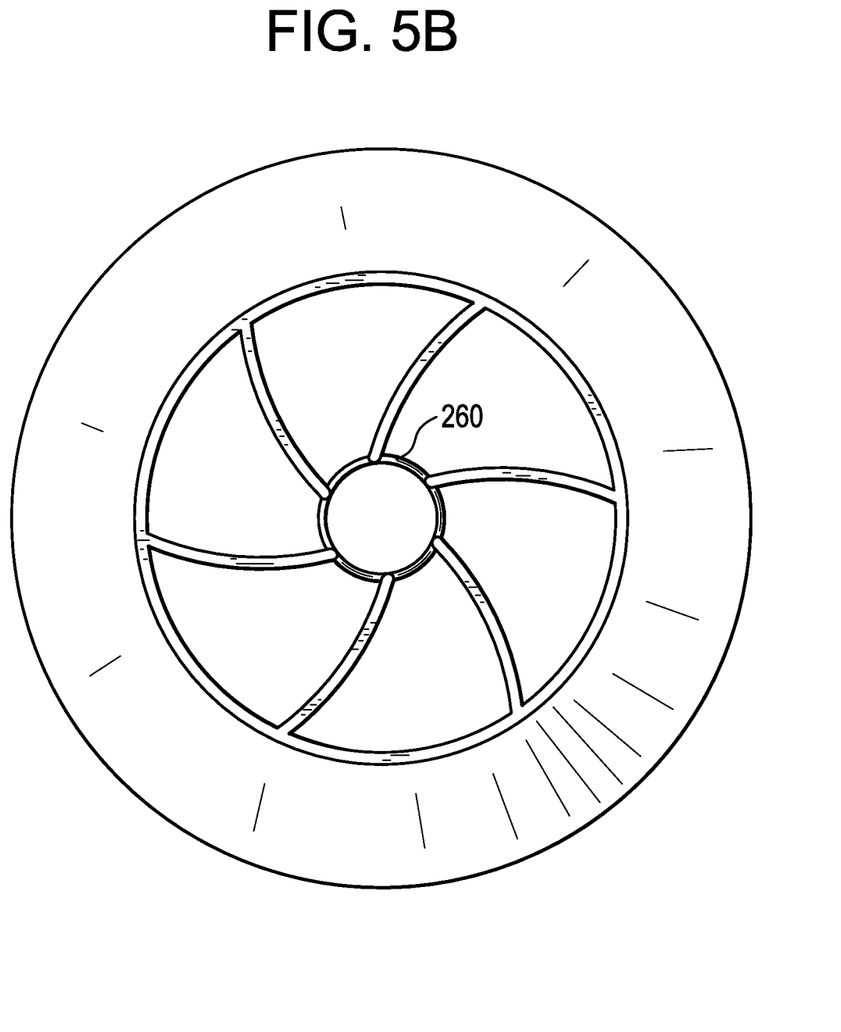
FIG. 5B is an end view of an example embodiment of the swirler in FIG. 5A.

FIG. 5A is a perspective view of an example embodiment of a swirler of the steam separator of FIG. 2, and FIG. 5B is an end view of an example embodiment of the swirler in FIG. 5A. The embodiment of FIGS. 5A-5B is the same as the embodiment of FIGS. 3A-3B except that an inner housing 260 defines the gap space 230 and therefore also defines the direct flow channel 250. Accordingly, distal ends 228 of the vanes 220 are connected to an exterior surface of the inner housing 260, while the proximal ends 226 are connected to the inner surface of the out swirler housing. As will appreciated, the swirler 200 may be an integral structure.

Figure 6:
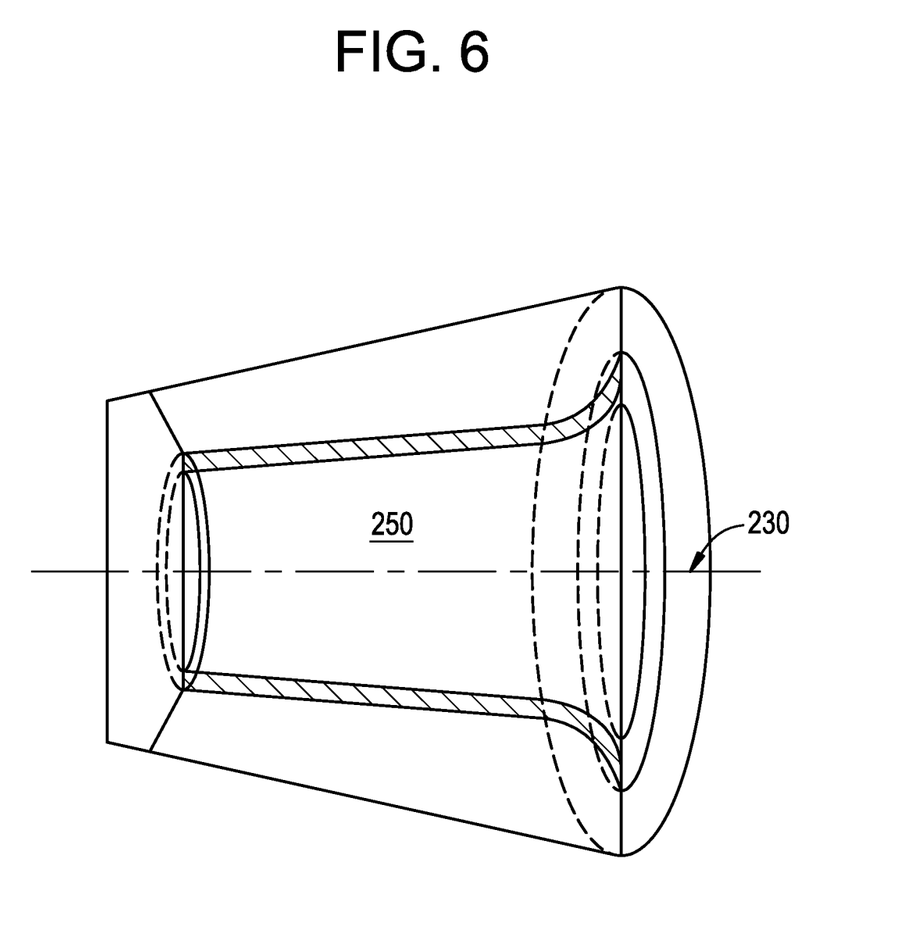
FIG. 6 illustrates an alternative longitudinal profile for the direct flow channel in the swirler embodiments.

As further shown in FIG. 6, a length and/or height of the vanes 220 in the radial direction may change along the longitudinal length of the swirler 200 to create a gap space 230 and direct flow channel 250 that changes profile longitudinally. For example, a conical shape may be created. Or, as another example, a bell mouth inlet to the direct flow channel 250 may be created.

In the example embodiments, the swirler 200 is configured to receive the gas-liquid two-phase FS from the standpipe 100 and separate the liquid of the gas-liquid two-phase FS. By providing a direct flow channel 250 in the swirler 200, example embodiments mitigate against the pressure loss that the gas-liquid two-phase flow FS experiences traversing the swirler 200. Additionally, the liquid and steam continues be segregated at the leading edge of the swirler 200 by action of the vanes 220 such that liquid migrates to the walls and steam to the longitudinal center. As will be appreciated, the shape (e.g., leading edge profile, trailing edge profile, length, etc.) of the plurality of vanes 220 may be modified based on characteristics of the gas-liquid two-phase FS at the entrance to the standpipe 100. For example, those characteristics may include steam-moisture content, flow distribution based on the position of the steam separation system in the BWR, the flow direction in relation to the shroud head 12a (see FIG. 1)), etc.

As will be further appreciated, differently located steam separators 1000 may have differently configured swirlers 200. For example, a volume of the direct flow channel of the swirler 200 in at least one of the plurality of steam separators 1000 located above a central region of the core is greater than a volume of the direct flow channel of the swirler 200 in at least one of the plurality of steam separators 1000 located above a peripheral region of the core In one embodiment, the plurality of swirler vanes 220 are tuned to a rifled channel 410 of the separation barrel 400 which will be described later. For example, the angle of the plurality of swirler vanes 220 is designed to correspond with the angle of the rifled channel 410 of the separation barrel 400 such that the system has a minimum or reduced drop in pressure and maximum or increased separating efficiency (reduced carry-over).

Returning to FIG. 2, the separation barrel 400 connects to the upper end surface of the first diffuser 150 and forms a flow path. For example, the separation barrel 400 is welded to the first diffuser 150. The separation barrel 400 is configured to receive the gas-liquid two-phase FS from the swirler 200. A skirt 600 forms an annular space which encloses the first diffuser 150 and separation barrel 400 so as to be concentric therewith and define a space therebetween referred to as the drain channel 700. The space between includes the drain channel 700 which will be described in detail later.

Inner walls 420 of the separation barrel 400 may be coated with an anti-fouling agent in order to minimize or reduce a loss in surface friction. The anti-fouling agent may be $TiO_2$, which is described in U.S. Patent Publication No. 2010/0055308, the contents of which are incorporated herein by reference.

The separation barrel 400 includes a rifled channel 410, a skirt 600, and a drain channel 700. The rifled channel 410 forms a rifled twist shape on inner walls 420 of the separation barrel 400. The rifled channel 410 is tuned with the plurality of swirler vanes 220. The rifled channel 410 separates the liquid from the gas-liquid two-phase FS and directs the liquid to the drain channel 700, thereby minimizing or reducing the re-entrainment of the separated liquid.

The gas-liquid two-phase FS flows through the separation barrel 400 contacting the rifled channel 410 having the rifled twist shape on the inner walls 420 of the separation barrel, separates the liquid contacting the inner walls 420 from the gas-liquid two-phase FS and directs the liquid to the drain channel 700. The swirler 200 centrifugally separates the liquid from the gas-liquid two-phase FS into droplets that attach to the inner walls 420 of the separation barrel 400 and the gas in the gas-liquid two-phase FS flows to the center of the separation barrel 400.

The rifled channel 410 on the inner walls 420 of the separation barrel 400 enhances the separating capability on and near the surface of the separation barrel 400 and also enhances the drainage capability of the separation barrel 400 while mitigating or preventing a loss in pressure. The rifled channel 410 will reduce the amount of swirl that needs to be imposed at the inlet 110 of the steam separator 1000, thereby mitigating or preventing a loss in pressure.

A series of orifices 430 on the rifled channel 410 will collect liquid from the gas-liquid two-phase FS and redirect it to the drain channel 700. A greater amount of orifices 430 are located in the portion of the rifled channel 410 closest to the standpipe 100 in order to control the drainage capacity. The shape of the orifices 430 is tuned to the location on the rifled channel 410.

The separated liquid of the gas-liquid two-phase FS is picked up by orifices in the rifled channel 410, and flows down through the drain channel 700. A pressure drop in the separation barrel 400 creates suction in the space between the separation barrel 400 and the drain channel 700 which is then applied to the gas-liquid two-phase FS prior to the gas-liquid two-phase FS entering the drain channel 700.

In other embodiments, the separation barrel 400 does not include rifled channels 410.

Returning to FIG. 2, an optional second diffuser 800 connects to the upper end surface of the separation barrel 400 and forms a flow path. For example, the second diffuser 800 is welded to the separation barrel 400. The second diffuser 800 allows for mixing of the gas-liquid two-phase FS exiting the separation barrel 400. The second diffuser 800 may be shaped such that the exit is wider than the entrance thereto, and the height and angle of sidewalls of the second diffuser may vary depending on the arrangement of the second diffuser 800 within the steam separator 1000. As with the diffuser 150, the second diffuser 800 may also be implemented using one of the above described swirler embodiments.

All steam separator components may be made of materials that are known to be acceptable for a nuclear environment. For instance, stainless steel (304, 316, XM-19, or equivalent) may be used.

Example embodiments thus being described, it will be appreciated by one skilled in the art that example embodiments may be varied through routine experimentation and without further inventive activity. Variations are not to be regarded as a departure from the spirit and scope of the example embodiments, and all such modifications as would be obvious to one skilled in the art are intended to be included within the scope of the following claims.

We claim:

1. A steam separator for a nuclear boiling water reactor, comprising:
   a standpipe configured to receive a gas-liquid two-phase flow stream;
   a first swirler configured to receive the gas-liquid two-phase flow stream from the standpipe, the first swirler configured to separate the gas-liquid two-phase flow stream, the first swirler including a direct flow portion and an indirect flow portion, the direct flow portion having a direct flow channel for permitting direct flow of the gas-liquid two-phase flow stream through the first swirler, the first swirler including,
an inner housing defining the direct flow channel, the inner housing and the direct flow channel having a different diameter at a first end of the first swirler than at a second end of the first swirler,
an outer housing, and
a plurality of vanes extending from an interior surface of the outer housing to an exterior of the inner housing, the indirect flow portion having at least one indirect flow channel defined by at least one vane of the plurality of vanes in the first swirler, the at least one indirect flow channel configured to provide an indirect flow of the gas-liquid two-phase flow stream through the first swirler.

2. The steam separator of claim 1, wherein the outer housing defines a first internal space; and
the plurality of vanes extend towards an interior of the outer housing, the plurality of vanes dividing the first internal space into the direct flow channel and the at least one indirect flow channel.

3. The steam separator of claim 2, wherein lateral surfaces of the adjacent ones of the plurality of vanes each define one of the at least one indirect flow channels.

4. The steam separator of claim 1, wherein the inner housing has a symmetrical cross section.

5. The steam separator of claim 1, further comprising:
a second swirler disposed downstream of the gas-liquid two-phase flow stream from the first swirler.

6. A nuclear boiling water reactor comprising:
a reactor pressure vessel;
a core in the reactor pressure vessel; and
a plurality of steam separators, the plurality of steam separators arranged above the core in the reactor pressure vessel, some of the plurality of steam separators including,
a standpipe configured to receive a gas-liquid two-phase flow stream, and
a first diffuser configured to receive the gas-liquid two-phase flow stream from the standpipe, the first diffuser including
a first swirler configured to receive the gas-liquid two-phase flow stream from the standpipe, the first swirler configured to separate the gas-liquid two-phase flow stream, the first swirler including a direct flow portion and an indirect flow portion, the direct flow portion having a direct flow channel for permitting direct flow of the gas-liquid two-phase flow stream through the first swirler, the first swirler including,
an inner housing defining the direct flow channel, the inner housing and the direct flow channel having a different diameter at a first end of the first swirler than at a second end of the first swirler,
an outer housing, and
a plurality of vanes extending from an interior surface of the outer housing to an exterior of the inner housing, the indirect flow portion having at least one indirect flow channel defined by at least one vane of the plurality of vanes in the first swirler, the at least one indirect flow channel configured to provide an indirect flow of the gas-liquid two-phase flow stream through the first swirler.

7. The nuclear boiling water reactor of claim 6, wherein a volume of the direct flow channel of at least one of the plurality of steam separators located above a central region of the core is greater than a volume of the direct flow channel of at least one of the plurality of steam separators located above a peripheral region of the core.

8. The nuclear boiling water reactor of claim 6, wherein lateral surfaces of the adjacent ones of the plurality of vanes each define one of the at least one indirect flow channels.

* * * * *

UNITED STATES PATENT AND TRADEMARK OFFICE
CERTIFICATE OF CORRECTION

PATENT NO. : 9,916,909 B2
APPLICATION NO. : 14/587226
DATED : March 13, 2018
INVENTOR(S) : Adrian M. Mistreanu et al.

Page 1 of 1

It is certified that error appears in the above-identified patent and that said Letters Patent is hereby corrected as shown below:

Item (73) Assignee should read:
GE-Hitachi Nuclear Energy Americas LLC, Wilmington, NC (US)

Signed and Sealed this
Tenth Day of July, 2018

Andrei Iancu
*Director of the United States Patent and Trademark Office*